United States Patent Office 2,785,938
Patented Mar. 19, 1957

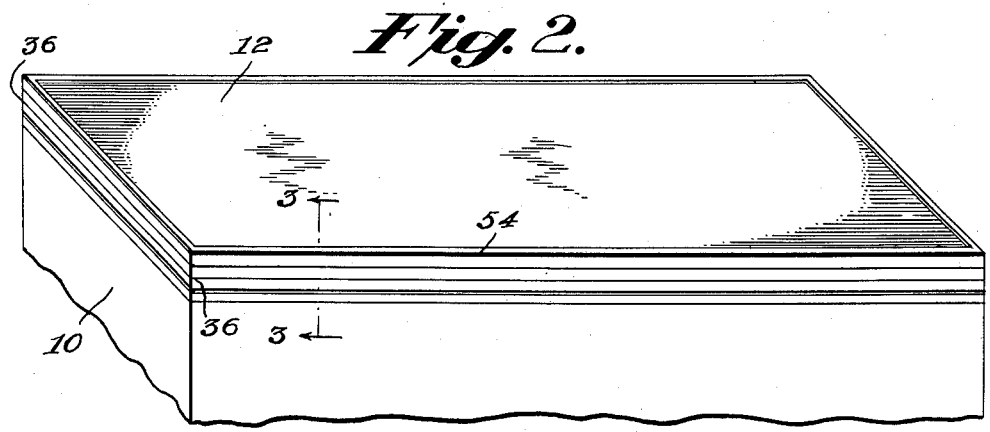
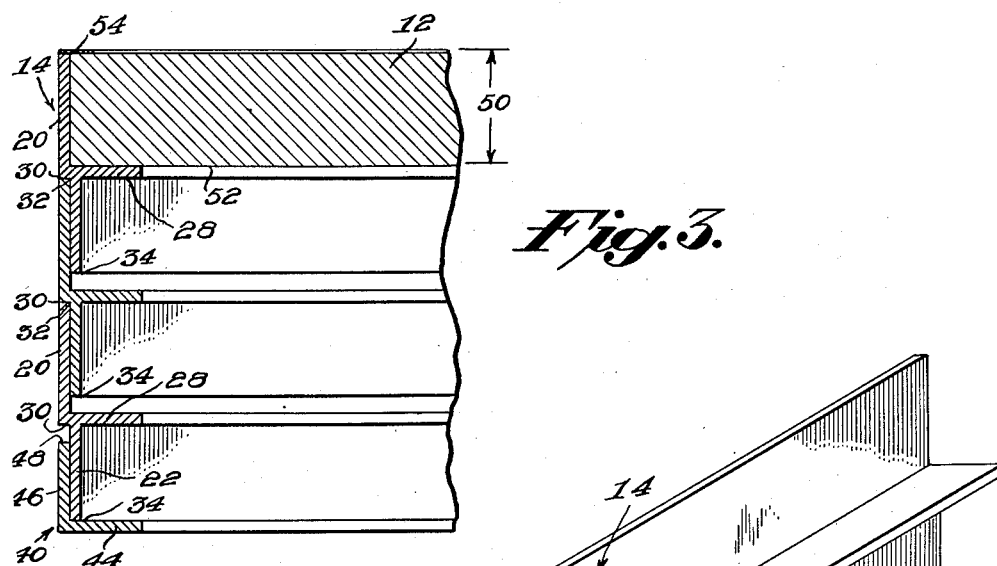
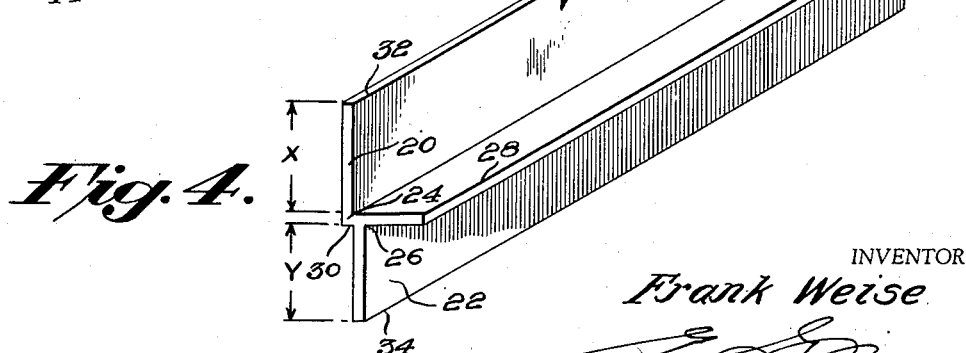

2,785,938

ADJUSTER MEANS FOR KITCHEN UNITS

Frank Weise, Philadelphia, Pa., assignor to Cornell Research Foundation, Inc., Ithaca, N. Y., a corporation of New York Application May 10, 1954, Serial No. 428,465

4 Claims. (Cl. 312—140.3)

This invention relates to kitchen units and the like and more particularly to a structural, vertically adjustable support therein whereby the counter top and work surface of the base cabinet of the kitchen units may be readily adjusted to provide the most convenient height for each work surface.

It is therefore a primary object of this invention to provide an improved kitchen unit having a counter top and work surface which may be adjusted in height from the floor and rigidly maintained in flat and level condition relative thereto.

It has long been desirous to construct kitchen units which will permit of such an adjustment of the work surfaces thereof so that when the cabinet units are installed or at any time thereafter, the work surfaces may be positioned at a higher elevation for use by tall people and/or at a lower elevation for short people and rigidly retained where set. Further, should the house or building wherein the improved kitchen units of this invention have been installed be sold, and the occupants thereof therefore changed, the work surfaces of these units may then be adjusted to suit the height and requirements of the new owner or occupant without otherwise altering the usefulness or appearance thereof.

It is a further object of this invention to provide a kitchen unit having a structurally integral counter top and work surface which may be adjusted without the use of special tools or shelf and thereafter positively and rigidly held to perform the above mentioned objects.

A still further object of the invention is to provide a rigid structural support of variable height in a kitchen cabinet and in the form of a multiple frame-like spacer unit for receiving and supporting the required counter top surface thereof whereby the working face may be raised or lowered by the addition or removal of said units as desired so that the various work centers of a kitchen may be of different height. It is desirous to have the oven and refrigerator, mixing, sink, range and serve centers of a kitchen of different heights for convenience and ease of preparation of the food products at the particular center.

Other objects of the invention are to provide a simple and economical supporting structure of permanent and solid character which furnishes in a kitchen cabinet a level working surface at desired and/or required heights, irrespective of unevenness or irregularity in the floor beneath the cabinet, and in use greatly enhancing the ornamental appearance of the cabinet.

The above and other objects and advantages are attained in the manner hereinafter set forth, reference being had to the accompanying drawings in which:

Fig. 2 is an isometric view of the various elements in assembled relation with each other;

Fig. 3 is a cross-sectional view of the assembled spacer units in assembled relation taken along line 3—3 of Fig. 2;

Fig. 4 is an isometric view of a section of one of the spacer units.

Figure 1:
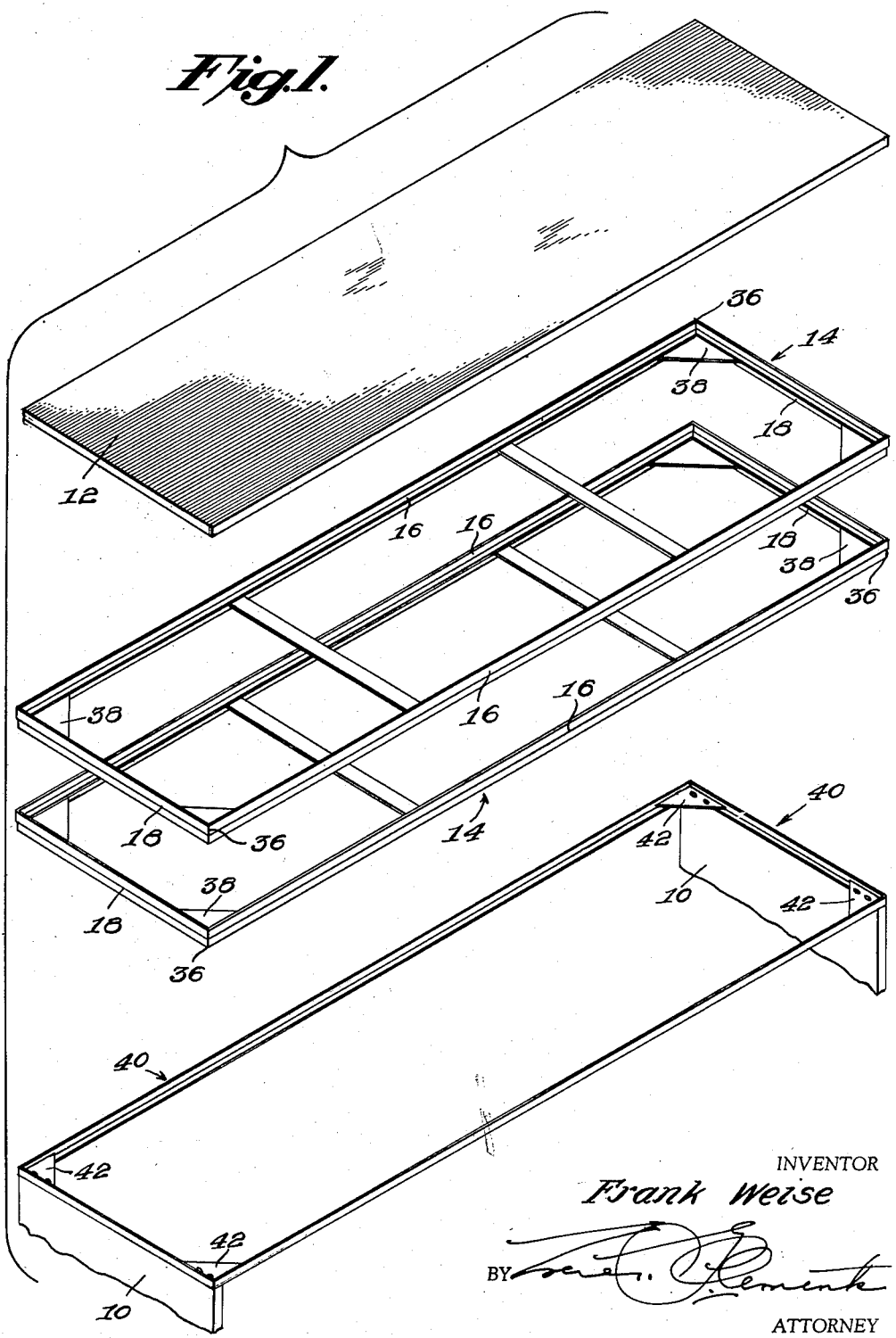
Fig. 1 is an exploded isometric view of the various elements comprising this invention.

With reference to the drawings, wherein like numerals represent like elements, there is shown a kitchen unit having a base cabinet 10 and a counter top work surface 12. The work surface 12 is adjustable to various desired heights from the floor by means of a series of rectangular nested spacing units generally designated as 14. The desired height to which the work surface 12 is to be adjusted and rigidly retained depends upon the number of the spacing units 14 used.

It will be noted by specific reference to Fig. 1 that each of the spacing units 14 is a closed hoop which is in the preferred and disclosed rectangular configuration shown. However, it should be here noted that such rectangular configuration is not essential to the above objects but only the preferred form as disclosed.

Each spacing unit 14 comprises sides 16 and ends 18 which are of the specific cross-sectional configuration as best shown in Fig. 4. In the cross section in Figs. 3 and 4, the sides 16 and ends 18 of each spacer unit, comprise a first flange 20 and a second flange 22 disposed in substantially parallel vertical position in regard to each other but also offset in both a vertical and horizontal relation. It should be noted that the first flange 20 is of a slightly greater width X than the width Y of the integrally connected second flange 22. Also, it should be noted that both flanges 20 and 22 are of substantially the same thickness and length. Joining together the adjacent side edges 24 and 26 of the flanges 20 and 22, respectively, is a reinforcing flange 28 which is disposed substantially normal to the flanges 20 and 22.

It also should be noted that the flange 22 is offset horizontally inwardly from the flange 20 a distance equal to the thickness of the flange 22, to provide a shoulder 30 on which bears the upper side edge 32 of the flange 20 when two of the spacer units 14 are firmly and rigidly nested together, see Fig. 3. While in this nested position it becomes apparent that the lower edge 34 of flange 22 does not touch the reinforcing flange 28 of the next adjacent spacer 14, thus assuring a close and smooth fit between the shoulder 30 and the upper edge 32 of the two adjacent nested spacer units 14.

The end and side portions of each unit are secured together by any known means, such as welding, to form corners 36. Each spacing unit 14 is reinforced at the corners 36 by welding or otherwise securing, such as riveting, a triangular shaped element 38 to the inward extension of the reinforcing flange 28.

Immediately overlying the upper portion of the base cabinet 10 are the bottom spacer units 40 which are of right angle configuration in cross section, as shown in Fig. 3, and are provided with triangular shaped reinforcements 42 which are adapted to be secured to the cabinet base portion 10 of the kitchen unit by any well known securing means such as bolts or the like.

The bottom spacer units 40 comprise two flanges 44 and 46 disposed at substantially right angles to each other. The flange 44 is disposed horizontally adjacent the base portion of the kitchen unit and the flange 46 is disposed vertically and adapted to have its free edge 48 spaced from the shoulder 30 of the hoop spacer unit 14 which is nested immediately adjacent the bottom spacer 40, as shown in Fig. 3.

The horizontally disposed flange 44 carries thereon the lower edge 34 of the flange 22 of the hooped spacer unit 14 which is nested immediately adjacent to the bottom spacer 40, as shown in Fig. 3. Further, the width of the flange 46 is substantially smaller than the width of the flange 20 of the spacer units 14.

The counter top work surface 12 of the kitchen unit has a thickness 50 substantially equal to the width X of the flange 20 and the counter top 12 is of substantially the same configuration of the hoop spacer units 14 and is placed within the periphery of the flange 20 and has ites bottom surface 52 resting in the reenforcing flange 28 of the uppermost nested spacer unit 14. The counter top work surface 12 is further provided with a chrome strip 54 around the peripheral upper edge thereof providing a small ridge thereon.

In the assembled position, as shown in Fig. 3, three spacer units 14 are shown rigidly retained in nested relationship with each other and the lowest unit 14 has its flange 22 nested within the vertical flange 46 and resting on the horizontal flange 44 of the bottom unit 40, and the upper spacer unit 14 has nested therein the counter top work surface 12. It should be noted that any number of units 14 may be used depending upon the height desired for the counter top 12, and only three of the units have been shown for the purpose of illustration.

When the units are in assembled relationship a smooth and attractive surface is provided by reason of the horizontal offset of the vertical flange 20 and 22 with respect to each other. This surface is easy to keep clean and has an attractive appearance.

Further, by reason of the nesting arrangement of the units 14, 40 and counter top 12 with each other a stable and rigid support is provided for the counter top element 12. In view of the fact that the spacer units 14 are of rigid hoop configuration it is not possible under normal and expected use that the units may move in horizontal relation to each other.

There is further provided an ornamental and sealing strip 54 extending about the periphery of the upper edge of the counter top element 12. The strip 54 is disposed to overlap the upper edge 32 of the flange 20 and the upper work surface of the counter top 12, thus providing a seal against liquids and the like from entering any space between the flange 20 and edge of the counter top element 12.

While I have disclosed my invention in accordance with a single specific structure embodiment thereof, such is to be considered as illustrative only, and not restrictive, the scope of the invention being defined in the subjoined claims.

What is claimed is:

1. In a kitchen unit having a base cabinet and a vertically adjustable counter top, the improvement comprising, in combination with the base cabinet and counter top of a means for adjusting the counter top to various vertical heights, said means comprising a plurality of separable continuous closed and removably nested spacer units each having interfitting cooperating opposed portions, said spacer units being removably interposed between the base cabinet and counter top in superimposed restrained relation rigidly supporting the counter top throughout substantially the entire peripheral edge thereof, the interfitting cooperating opposed portions of each spacer unit comprising a reenforcing flange, a first flange disposed substantially normal to and projecting outwardly from said reenforcing flange and terminating in a bearing edge portion, a second flange having a width less than the width of said first flange disposed in substantially parallel relation thereto and projecting outwardly from said reenforcing flange in a direction opposite to the first flange, said second flange being offset from said first flange a distance substantially equal to the thickness of said first flange defining a shoulder portion, whereby, when the spacer units are interposed between the counter top and the base cabinet the second flange of one adjacent spacer unit is nested within the first flange of the spacer unit disposed immediately therebelow with the bearing edge portion of the first flange of the lower spacer unit engaging the shoulder portion of the adjacent spacer unit thereabove.

2. An adjusting means adapted to be removably positioned intermediate a base cabinet and a counter top of a kitchen unit providing vertical adjustment of a counter top in relation to a base cabinet, said adjuster means comprising a plurality of independent continuous closed spacer units each having interfitting cooperating opposed portions, said spacer units being adapted to be removably interposed between a base cabinet and counter top in superimposed restrained relation rigidly supporting a counter top throughout substantially the entire peripheral edge thereof, said cooperating opposed portions of each spaced unit comprising a substantially horizontally disposed reenforcing flange, a first flange disposed substantially normal to and projecting upwardly from the reenforcing flange and terminating in a bearing edge portion, a second flange of less width than said first flange disposed substantially parallel thereto and offset inwardly therefrom a distance substantially equal to the thickness of the first flange and projecting downwardly from said reenforcing flange, said offset relation of said first and second flanges defining a shoulder portion whereby when said spacer units are interposed between a counter top and a base cabinet the second flange of one adjacent spacer unit is nested within the first flange of the spacer unit immediately below with the bearing edge portion of the first flange of the lower spacer unit engaging the shoulder portion of the spacer unit immediately above.

3. A kitchen unit comprising, in combination, a base cabinet, a counter top, adjuster means for vertically adjusting the counter top to various desired vertical heights relative to the base cabinet, said adjuster means comprising a plurality of independent, separable, continuous closed, nested spacer units each having interfitting cooperating opposed portions, said spacer units being removably interposed between the base cabinet and the counter top in superimposed restrained relation rigidly supporting the counter top throughout substantially the entire peripheral edge thereof, said cooperating opposed portions of each spacer unit comprising a substantially horizontally disposed reenforcing flange, a first flange disposed substantially normal to and projecting upwardly from the reenforcing flange and terminating in a bearing edge portion, a second flange of less width than said first flange disposed substantially parallel thereto and offset inwardly therefrom a distance substantially equal to the thickness of the first flange and projecting downwardly from said reenforcing flange, said offset relation of said first and second flanges defining a shoulder portion whereby when the spacer units are interposed between the counter top and the base cabinet the second flange of one adjacent spacer unit is nested within the first flange of the spacer unit immediately therebelow with the bearing edge portion of the first flange of the lower spacer unit engaging the shoulder portion of the spacer unit immediately above.

4. An adjusting means adapted to selectively position a counter top relative to a base cabinet of a kitchen unit, said adjusting means comprising an independent continuous closed spacer unit having portions thereof adapted to interfit and cooperate with opposed portions on other like units, said portions of said spacer unit including a substantially horizontally disposed reenforcing flange, a first flange disposed substantially normal to and projecting upwardly from the reenforcing flange and terminating in a bearing edge portion, a second flange of less width than said first flange disposed substantially parallel thereto and offset inwardly therefrom a distance substantially equal to the thickness of the first flange and projecting downwardly from said reenforcing flange, said offset relation of said first and second flanges defining a shoulder portion whereby when said portions of the said spacer unit are interfitted with opposed portions on other like units the said second flange of the said spacer unit will be nested within a first flange on other like units which correspond to the said first flange of the said spacer unit and the bearing edge portion of the said first flange will engage a shoulder portion on other like units which corresponds to the shoulder portion of the said spacer unit.

References Cited in the file of this patent

UNITED STATES PATENTS

| | | |
|---|---|---|
| 254,489 | Marks | Mar. 7, 1882 |
| 891,143 | Burns | June 16, 1908 |
| 1,008,239 | Bunte | Nov. 7, 1911 |
| 1,038,923 | Mathy | Sept. 17, 1912 |
| 2,540,849 | Walker | Feb. 6, 1951 |
| 2,618,526 | Septer | Nov. 18, 1952 |